(12) United States Patent
Tanaka et al.

(10) Patent No.: US 6,436,494 B2
(45) Date of Patent: Aug. 20, 2002

(54) POLYPROPYLENE RESIN COMPOSITION AND NON-STRETCHED FILM THEREOF

(75) Inventors: Yasuo Tanaka; Norihiko Nakagawa; Naoto Yasaka, all of Ichihara (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/731,022

(22) Filed: Dec. 7, 2000

Related U.S. Application Data

(62) Division of application No. 09/247,551, filed on Feb. 10, 1999, now Pat. No. 6,191,219.

(30) Foreign Application Priority Data

Feb. 10, 1998 (JP) .............................................. 10/28986

(51) Int. Cl.$^7$ ........................ B29D 22/00; B29D 23/00; B32B 1/08; B32B 27/32; C08L 53/00
(52) U.S. Cl. .................... 428/34.3; 428/35.2; 428/35.7; 428/523; 525/88; 525/95; 525/98; 525/232; 525/240
(58) Field of Search .............................. 525/95, 88, 98, 525/232, 240; 428/34.3, 35.2, 35.7, 523

(56) References Cited

U.S. PATENT DOCUMENTS 6,191,219 B1 * 2/2001 Tanaka et al.

FOREIGN PATENT DOCUMENTS

| EP | 0353981 A3 | 2/1990 |
| EP | 0716121 | 6/1996 |
| EP | 0716121 A1 | 6/1996 |
| EP | 0792914 | 9/1997 |
| EP | 0844280 | 5/1998 |
| WO | WO 9214784 | 9/1992 |

* cited by examiner

*Primary Examiner*—Patrick D. Niland
(74) *Attorney, Agent, or Firm*—Sherman & Shalloway

(57) ABSTRACT

A polypropylene resin composition capable of bringing about a non-stretched film superior in the transparency, in the impact resistance, in the low temperature heat-sealability and in the strength of heat-sealing, which composition comprises (A) a polypropylene resin, (B) a specific ethylene/α-olefin random copolymer and (C) a specific propylene/ethylene/1-butene random copolymer.

3 Claims, No Drawings

POLYPROPYLENE RESIN COMPOSITION AND NON-STRETCHED FILM THEREOF

This application is a division of application Ser. No. 09/247,551, now U.S. Pat. No. 6,191,219 filed Feb. 10, 1999 to which priority is claimed.

FIELD OF THE INVENTION

The present invention relates to a polypropylene resin composition and to a non-stretched film made of such resin composition. Specifically, the invention relates to a polypropylene resin composition comprising a polypropylene resin, a specific ethylene/α-olefin random copolymer and a specific propylene/ethylene/1-butene random copolymer, as well as to a non-stretched film made of such resin composition.

BACKGROUND OF THE INVENTION

Films of polypropylene resins have, due to their favorable performances in the mechanical properties, such as tensile strength, stiffness and so on, in the optical properties, such as gloss, transparency and the like and in the hygienic acceptability as the material for dealing with food products by, such as, non-toxicity and odorless property, found their wide uses in the field of packaging of food products.

It has been practised here to incorporate in the resin a rubbery component, such as an ethylene/propylene copolymer, ethylene/butene copolymer or the like, since a film made solely of a polypropylene resin exhibits an inferior impact resistance and permits to effect heat sealing only at higher temperatures.

While an addition of a rubbery component may improve the impact resistance and may permit to lower the heat-sealing temperature, it is accompanied by a shortcoming that the transparency of the resulting film will be deteriorated and the strength of heat sealing becomes decreased.

SUMMARY OF THE INVENTION

An object of the present invention is to provide a polypropylene resin composition for non-stretched film capable of bringing about a non-stretched film superior in the transparency, in the impact resistance, in the low temperature heat-sealability and in the strength of heat-sealing.

Another object of the present invention is to provide a non-stretched film superior in the transparency, in the impact resistance, in the low temperature heat-sealability and in the strength of heat-sealing.

The present invention provides for a polypropylene resin composition for non-stretched film as well as for a non-stretched film given below:

(1) A polypropylene resin composition for non-stretched film, comprising
  (A) 50–95 parts by weight of a polypropylene resin,
  (B) 3–40 parts by weight of an ethylene/α-olefin random copolymer with the α-olefin having at least three carbon atoms, the said random copolymer having a content of the structural unit of ethylene of 60–95 mole %, a density of 0.900 g/cm$^3$ or lower, an MFR (melt flow rate, determined according to ASTM D-1238 at 190° C. under a load of 2.16 kg) of 0.1–50 g/10 min. and a molecular weight distribution expressed by Mw/Mn, determined by gel permeation chromatography(GPC), of 3 or less, and
  (C) 2–20 parts by weight of a propylene/ethylene/1-butene random copolymer, which meets the three conditions 1), 2) and 3) given below, wherein the amounts of (A), (B) and (C) sum up to 100 parts by weight and wherein the said random copolymer (C) meets the following three conditions, namely,
  condition 1) that it comprises 50–88 mole % of propylene unit, 2–30 mole % of ethylene unit and 10–40 mole % of 1-butene unit and that the content of 1-butene unit is greater than the content of ethylene unit;
  condition 2) that it has an MFR, determined according to ASTM D-1238 at 230° C. under a load of 2.16 kg, of 0.1–50 g/10 min.; and
  condition 3) that it has a molecular weight distribution expressed by Mw/Mn, determined by gel permeation chromatography (GPC), of 3 or less.

(2) A polypropylene resin composition for non-stretched film as defined in the above (1), wherein the polypropylene resin (A) comprises at least one selected from the group consisting of propylene homopolymers, propylene/α-olefin random copolymers having a content of the α-olefin other than propylene of 10 mole % or lower and propylene/α-olefin block-copolymers having a content of n-decane-extractable portion of 10% by weight or less.

(3) A polypropylene resin composition for non-stretched film as defined in the above (1) or (2), wherein the ethylene/α-olefin random copolymer (B) is an ethylene/butene random copolymer having an ethylene unit content of 60–95 mole % and a 1-butene unit content of 5–40 mole %.

(4) A non-stretched film made of a polypropylene resin composition as defined in either one of the above (1) to (3).

DETAILED DESCRIPTION OF THE INVENTION

Below, the polypropylene resin composition for non-stretched film and the non-stretched film according to the present invention will be described in detail.

The polypropylene resin composition for non-stretched film according to the present invention comprises a polypropylene resin (A), an ethylene/α-olefin random copolymer (B) and a propylene/ethylene/1-butene random copolymer (C).

The non-stretched film according to the present invention is made of the above polypropylene resin composition.

First, the description is directed to the polypropylene resin (A) composing the polypropylene resin composition.

According to the present invention, any voluntary one among known polypropylene resins can be chosen for the polypropylene resin (A). For such a polypropylene resin (A), there may be enumerated, for example, homopolymers of propylene and random copolymers and block-copolymers of propylene/α-olefin with the α-olefin being other than propylene. The polypropylene resin (A) may be modified with a monomer having polar group(s), such as maleic anhydride or so on.

Favorable polypropylene resins (A) comprises at least one selected from the group consisting of homopolymers of propylene, propylene/α-olefin random copolymers containing at the most 10 mole %, preferably 8 mole % or less, of other α-olefin unit and propylene/α-olefin block-copolymer having a content of n-decane-extractable portion, namely, a portion to be extracted by n-decane, of 10% by weight or less, especially 8% by weight or less.

In the context of this specification, it is meant by the "α-olefin unit" a structural unit derived from an α-olefin in a polymer. The same applies also to the "ethylene unit", "propylene unit" and "1-butene unit". In the present invention, α-olefin encompasses ethylene.

As the α-olefins composing the propylene/α-olefin random copolymer or the propylene/α-olefin block-copolymer, there may favorably be enumerated α-olefins having 2–20 carbon atoms other than propylene and concrete examples thereof include ethylene, 1-butene, 1-pentene, 1-hexene, 1-heptene, 1-octene, 1-decene, 1-dodecene, 1-hexadecene and 4-methyl-1-pentene. These α-olefins may be incorporated either solely or in a combination of two or more of them.

The polypropylene resin (A) to be employed according to the present invention can be produced by processes known per se using a solid titanium catalyst or a metallocene catalyst known per se.

It is favorable that the polypropylene resin (A) has a degree of crystallinity, determined by X-ray diffraction method, of at least 40%, especially at least 50%, and a melting point (Tm), determined by DSC method, in the range of 100–165 °C. It is preferable to incorporate a polypropylene resin (A) having a melting point higher than that of the ethylene/α-olefin random copolymer (B) and that of the propylene/ethylene/1-butene random copolymer (C).

The polypropylene resin (A) has a melt flow rate (MFR), determined in accordance with ASTM D 1238 at 230° C. under a load of 2.16 kg, in the range of, usually, 0.1–300 g/10 min., preferably 1–50 g/10 min.

The polypropylene resin (A) may be incorporated either alone or in a combination of two or more.

Now, the ethylene/α-olefin random copolymer (B) will be described.

The ethylene/α-olefin random copolymer (B) has characteristic features of 1) a content of the ethylene unit in the range of 60–95 mole %, preferably 70–90 mole %,
2) a density of 0.900 g/cm³ or less, preferably in the range of 0.850–0.880 g/cm³,
3) an MFR (melt flow rate, determined according to ASTM D 1238 at 190° C. under a load of 2.16 kg) in the range of 0.1–50 g/10 min., preferably 0.2–30 g/10 min., especially preferably 0.5–10 g/10 min., and
4) a molecular weight distribution expressed by Mw/Mn, determined by gel permeation chromatography (GPC) using o-dichlorobenzene as the eluent and monodisperse polystyrenes as the standard, of 3 or less.

The α-olefin in the ethylene/α-olefin random copolymer (B) has 3 or more carbon atoms, preferably 3–20 carbon atoms, especially preferably 3–8 carbon atoms.

As concrete examples of the α-olefin, there may be enumerated propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene. They may be employed either alone or in a combination of two or more.

By compounding the ethylene/α-olefin random copolymer as above together with the propylene/ethylene/1-butene random copolymer (C) and with the polypropylene resin (A), a resin composition superior in the low temperature impact resistance, in the low temperature heat-sealability and in the transparency can be obtained.

It is favorable that the ethylene/α-olefin random copolymer (B) has a degree of crystallinity, determined by X-ray diffraction method, of, preferably, lower than 40%, more preferably not higher than 30%. By using an ethylene/α-olefin random copolymer (B) having a degree of crystallinity lower than 40%, a film superior in the low temperature heat-sealability and in the impact resistance (a superior film impact strength characteristic) can be obtained.

The ethylene/α-olefin random copolymer (B) has preferably a parameter (B-value) for the randomness of chain distribution of monomeric units in the copolymer, determined by $^{13}$C-NMR, in the range of 1.0–1.4. The B-value is a parameter indicating the state of compositional distribution of structural units in the molecular chain of the copolymer and can be calculated according to the following equation (I).

$$B = POE/(2 \cdot PO \cdot PE) \tag{I}$$

In this equation, PE and PO represent the mole fractions of the ethylene units and the α-olefin units, respectively, in the ethylene/α-olefin random copolymer and POE is a proportion of number of ethylene/α-olefin alternating chains in the total number of dyad chains.

The values for PE, PO and POE can be calculated in the practice as follows:

A sample of an ethylene/α-olefin random copolymer (B) is prepared by dissolving 200 mg of the random copolymer homogeneously in 1 ml of hexachloro-butadiene in a 10 mm φ test tube, whereupon $^{13}$C-NMR spectrum of this sample is observed under the following conditions:

examination temperature: 120° C.
examination frequency: 20.05 MHz
breadth of spectral line: 1500 Hz
width of filter: 1500 Hz
pulse repetition interval: 4.2 sec.
pulse width: 7 μsec.
number of integration: 2,000–5,000

The values of PE, PO and POE can be determined according to the methods reported, for example, by G. J. Ray {"Macromolecules", 10, 773 (1977)}, by J. C. Randall {"Macromolecules", 15, 353 (1982)} and by K. Kimura {"Polymer", 25, 4418 (1984)}, based on the $^{13}$C-NMR spectrum observed as above.

The B-value equals 2, when both the comonomer units are ideally alterating in the ethylene/α-olefin random copolymer, and equals to zero, when both the comonomer units are present in the copolymer as ideal block-copolymer by being completely separately polymerized.

When an ethylene/α-olefin random copolymer (B) having a B-value in the range of 1.0–1.4 is used, a polypropylene resin composition exhibiting superior heat resistance can be obtained.

The ethylene/α-olefin random copolymer (B) may favorably have an intrinsic viscosity [η], determined in decalin (decahydronaphthalene) at 135° C., in the range of 0.5–5.0 dl/g.

As the ethylene/α-olefin random copolymer (B), a branched long chain type copolymer having a gη*-value (See Japanese Patent Laid Open Sho 58-191705 A), defined by the equation (II) given below, in the range of 0.2 to 0.95 or a linear chain copolymer having a gη*-value exceeding 0.95 may be preferred.

$$g\eta^* = [\eta]/[\eta]_{blank} \tag{II}$$

In the equation (II), [η] represents the intrinsic viscosity of the ethylene/α-olefin random copolymer (B) determined in decalin at 135° C. and [η]$_{blank}$ denotes the intrinsic viscosity of a linear chain ethylene/propylene random copolymer used as the standard which has an ethylene content of 70 mole % and a weight-average molecular weight (by light scattering method) identical with that of the ethylene/α-olefin random copolymer having the intrinsic viscosity [η] measured as above.

As the ethylene/α-olefin random copolymer (B) of branched long chain type having a gη*-value of 0.2–0.95, those which are produced using a metallocene catalyst comprising a metallocene represented by the formula (2) as will be described afterwards are preferred.

As the ethylene/α-olefin random copolymer (B) of linear chain type having a gη*-value exceeding 0.95, those which are produced using a metallocene catalyst comprising the metallocene represented by the formula (1) or using a metallocene catalyst comprising a metallocene represented by the formula (2), as will be described afterwards, in which $R^{41}$–$R^{44}$ may form a ring by combining a part of each of the groups adjoining each other together with the carbon atoms bound thereto are preferred.

When an ethylene/α-olefin random copolymer (B) having the characteristic features given above is employed, a polypropylene resin composition superior in the mechanical strength, in the weatherability, in the ozone-fastness, in the low temperature-flexibility and in the heat resistance can be obtained. When, in particular, an ethylene/α-olefin random copolymer (B) of branched long chain type having a gη*-value in the range of 0.2–0.95 is employed, a polypropylene resin composition which is superior especially in the moldability can be obtained and, when an ethylene/α-olefin random copolymer (B) of linear chain type having a gη*-value exceeding 0.95 is employed, a polypropylene resin composition especially superior in the film-impact performance can be obtained. When an ethylene/α-olefin random copolymer (B) of an α-olefin of 6–10 carbon atoms is employed, a polypropylene resin composition superior in the mechanical strength, in the low temperature flexibility and in the heat resistance can be obtained.

While the ethylene/α-olefin random copolymer (B) as mentioned above can be obtained by co-polymerizing ethylene with an α-olefin in the presence of a catalyst based on vanadium or titanium, such an ethylene/α-olefin random copolymer is preferred, that is produced using a metallocene catalyst which will be described afterwards.

As the vanadium-based catalyst to be used for producing the ethylene/α-olefin random copolymer (B), preference is given to those which are composed of a soluble vanadium compound and an alkylaluminum halide.

As the soluble vanadium compound for the vanadium-based catalyst, there may be exemplified concretely vanadium tetrachlodide, vanadiumoxy trichloride, monoethoxy-vanadium dichloride, triacetylacetonatovanadium and triacetylacetonato-oxyvanadium.

As the alkylaluminum halide for the vanadium-based catalyst, there may be exemplified concretely ethylaluminum dichloride, diethylaluminum monochloride, ethylaluminum sesquichloride, diethylaluminum monobromide, diisobutylaluminum monochloride, isobutylaluminum dichloride and isobutylaluminum sesquichloride.

For the catalyst based on titanium mentioned above for producing the ethylene/α-olefin random copolymer (B), preference is given to a catalyst to be used for olefin polymerization, which is prepared from a solid titanium catalyst component and an organometallic compound catalyst component together with an optionally incorporated electron donor.

As the solid titanium catalyst component for olefin polymerization, for example, those in which titanium trichloride or a composition containing titanium trichloride is supported on a carrier, e.g. one which has a specific surface area of 100 m$^2$/g or more, or those in which magnesium, a halogen, an electron donor (preferably an aromatic carboxylic acid ester or an alkyl group-containing ether) and titanium are included as the indispensable components by being supported on a carrier, e.g. one which has a specific surface area of 100 m$^2$/g or greater. Among them, the solid titanium catalyst component of the latter is preferred.

For the organometallic compound catalyst component of the catalyst for olefin polymerization as mentioned above, organoaluminum compounds are employed favorably. Concretely, there may be enumerated, for example, trialkylaluminums, dialkylaluminum halides, alkylaluminum sesquihalides and alkylaluminum dihalides. These organoaluminum compounds may be chosen adequately in accordance with each specific solid titanium catalyst component employed.

For the electron donor of the catalyst for olefin polymerization as mentioned above, various organic compounds containing nitrogen atom, phosphorus atom, sulfur atom, silicium atom or boron atom may be used, wherein esters and ethers containing such atoms may favorably be enumerated.

The catalyst for olefin polymerization may be activated by, for example, co-crushing, and may be used after being subjected to a prepolymerization of an olefin.

Now, the description will be directed to the propylene/ethylene/1-butene random copolymer (C).

As mentioned previously, the propylene/ethylene/1-butene random copolymer (C) should meet the three conditions 1) to 3) given previously. These conditions are described below in order.

In the condition 1), the chemical composition of the propylene/ethylene/1-butene random copolymer (C) is specified.

Thus, the propylene/ethylene/1-butene random copolymer (C) should comprise 50–88 mole % of the propylene unit, 2–30 mole % of the ethylene unit and 10–40 mole % of the 1-butene unit, wherein it comprises preferably 60–85 mole % of the propylene unit, 3–20 mole % of the ethylene unit and 10–30 mole % of the 1-butene unit, particularltly preferably 60–85 mole % of the propylene unit, 3–20 mole % of the ethylene unit and 12–30 mole % of the 1-butene unit. Here, the content of the 1-butene unit should be greater than that of the ethylene unit.

By adjusting the chemical composition of the propylene/ethylene/1-buten random copolymer (C) to the above proportion, the copolymer (C) will have a better balance between the elastomeric property, on the one hand, and the compatibilities of the copolymer (C) with the polypropylene resin (A) and with the ethylene/α-olefin random copolymer (B), on the other hand.

The propylene/ethylene/1-butene random copolymer (C) may contain further α-olefin unit(s) other than the propylene unit, the 1-butene unit and the ethylene unit in a small proportion within a limit not obstructing the advantageous feature mentioned above, such as for example, 10 mole % or less.

The conditions 2) and 3) prescribe the melt flow rate (MFR) as an index for the molecular weight and the molecular weight distribution (Mw/Mn), respectively, of the propylene/ethylene/1-butene random copolymer (C).

The MFR, determined at 230° C. under a load of 2.16 kg according to ASTM D 1238, of the propylene/ethylene/1-butene random copolymer (C) should be in the range of 0.1–50 g/10 min., preferably 0.2–30 g/10 min., especially preferably 0.1–10 g/10 min.

The Mw/Mn ratio of the propylene/ethylene/1-butene random copolymer (C) should be not higher than 3. The Mw/Mn ratio is a value converted into a polystyrene-based value and can be determined by a gel permeation chromatography (GPC) using o-chlorobenzene as the elution solvent and using monodisperse dispersions of polystyrenes as the standard.

The molecular weight distribution expressed by Mw/Mn can be determined using a GPC apparatus, for example GPC-150 C. of the firm Water Co. by the following procedures. Thus, using TSK GNH TH (trademark, of TOSO K.K., with a column size of 7.8 mm diameter and 600 mm length) as a separation column, a gel permeation chromatography is effected at a column temperature of 140° C. using o-dichlorobenzene as the mobile phase and 0.025% by weight of BHT as the antioxidant at a sample concentration of 0.1% by weight and a feed rate of 1.0 ml/min. in a sample charge amount of 500 μl under the use of a differential refractometer as the detector. For the separation column, there may also be employed TSK GMH-HT or TSK GMH-HTL (trademarks) of TOSO K.K. As the standard polystyrene monodisperse dispersion, one available from the firm TOSO may be employed.

When the propylene/ethylene/1-butene random copolymer (C) has an MFR and a molecular weight distribution within the above-indicated ranges, it has a superior compatibility with the polypropylene resin (A) and the resin composition containing such random copolymer (C) will exhibit better processability upon molding with the resulting molded product of superior transparency with scarce surface tackiness.

For the propylene/ethylene/1-butene random copolymer (C) according to the present invention, one which has a certain microstructure is preferred.

Thus, the propylene/ethylene/1-butene random copolymer (C) may preferably contain i) a three-chain structure constituted exclusively of propylene unit with head-to-tail coupling or ii) a three-chain structure constituted of propylene unit with head-to-tail coupling and 1-butene unit. Among such random copolymer (C) having the three-chain structure i) or ii), such ones are preferred, in which the $^{13}$C-NMR observation (in a hexachlorobutadiene solution, on the basis of tetramethylsilane) for the side chain methyl group of the second propylene unit in the three-chain structure i) or ii) will show the integrated areas for the peaks found within the range of 21.2–21.7 ppm amounting at least 90%, preferably 92% or more, of the integrated areas of the total peaks appearing within the range of 19.7–21.7 ppm assumed to be 100%.

For the propylene/ethylene/1-butene random copolymer (C), those in which the proportion of the site-irregular units caused by 2,1-insertion of propylene monomer, determined by $^{13}$C-NMR, is at least 0.05%, preferably 0.05–0.4%, more preferably 0.05–0.3%, of the total propylene units are favorable.

For the propylene/ethylene/1-butene random copolymer (C), those in which the proportion of the site-irregular units caused by 1,3-insertion of propylene monomer is not higher than 0.05%. Upon the polymerization, propylene monomer will be incorporated by 1,2-insertion (the methylene side will combine with the catalyst as described afterwards), while in a rare case it may be incorporated by 2,1-insertion or 1,3-insertion. The propylene monomers incorporated by the 2,1-insertion or by the 1,3-insertion constitute in the polymer chain site-irregular units.

The proportion of the 2,1-inserted propylene monomers relative to the total propylene units can be determined by $^{13}$C-NMR in accordance with the teaching disclosed in "Polymer", 30, (1989) 1350 from the following mathematical equation (III):

[Proportion of site-irregular units due to 2,1-insertion]=
[[0.25·$I\alpha\beta$·{Struct.($i$)}+0.5·$I\alpha\beta$·{Struct.($ii$)}]×100]÷[$I\alpha\alpha$+ $I\alpha\beta$·{Struct.($ii$)}+0.5·[$I\alpha\gamma$+$I\alpha\beta$·{Struct.($i$)}+$I\alpha\delta$]] (III)

Here, the nomenclature for the peaks are in accordance with the method of Carman et al: "Rubber Chem. Technol.", 44, (1971), 781. The symbols $I\alpha\beta$ etc. refer to the integrated peak area for the $\alpha\beta$ peak etc. When the integrated area for a peak is difficult to measure directly from the spectrum chart due to reasons, such as overlapping and the like, a carbon peak having corresponding area may be substituted therefor.

The proportion of the three-chain structure caused by the 1,3-insertion of propylene in percent value can be calculated by dividing ½ of the integrated area of $\alpha\gamma$ peak (resonating at around 27.4 ppm) by the sum of the integrated areas of the total peaks of methyl group plus ½ of the integrated area of $\beta\gamma$ peak and multiplying the resulting quotient by 100.

For the propylene/ethylene/1-butene random copolymer (C) according to the present invention, those which are produced using a metallocene catalyst are preferred.

As the metallocene catalyst, those based on metallocene are preferred, which comprise I) (a) a transition metal compound of bridged type (in the following, denoted sometimes simply as a transition metal compound) represented by the following formula (1):

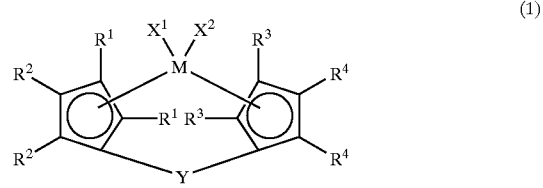

(1)

In the Formula (1), M denotes a transition metal atom of Groups IV–VIB of the Periodic Table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —SO$_2$—, —NR$^5$—, —P(R$^5$)—, —P(=O)(R$^5$)—, —BR$^5$— or —AlR$^5$— with $R^5$ being hydrogen atom, a halogen atom, a hydrocarbyl of 1–20 carbon atoms or a halogenated hydrocarbyl of 1–20 carbon atoms, and II) at least one compound capable of activating the above-identified transition metal compound of bridged type (a) and selected from the group consisting of (b) an organoaluminum compound
(C) an organoaluminum-oxy compound and
(d) an ionizing ionic compound capable of forming an ion pair by reacting with the transition metal compound represented by the formula (1)

In the formula. (1), M denotes a transition metal of the Groups IV–VIB and stands concretely for titanium, zirconium, hafnium, vanadium, niobium, tantalum, chromium, molybdenum, wolfram or so on, wherein preference is given to titanium, zirconium and hafnium with particular preference to zirconium.

In the formula (1), $R^1$, $R^2$, $R^3$ and $R^4$ may be identical with or different from each other and stand each for hydrogen atom, a halogen atom, a hydrocarbon group which may be substituted by halogen, a silisium-, oxygen-, sulfur-, nitrogen- or phosphorus-containing group or may form a ring by combining a part of each of the adjoining groups together with the carbon atoms bound thereto. In the formula (1), the groups $R^1$ to $R^4$ given each in a pair suggest that it is preferable that the two of the same symbol will be coupled together when a ring is formed from them. Thus, a ring may preferably be formed from, for example, two $R^1$ groups by being bound together.

As the halogen atom represented by $R^1$–$R^4$ in the formula (1), there may be exemplified fluorine, chlorine, bromine or iodine.

As the hydrocarbyl of 1–20 carbon atoms represented by $R^1$ to $R^4$ in the formula (1), there may be enumerated, for example, alkyl groups, such as methyl, ethyl, n-propyl, isopropyl, n-butyl, isobutyl, sec-butyl, tert-butyl, n-pentyl, neopentyl, n-hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- and β-naphthyls, methylnaphthyl, anthracenyl, phenanthryl, benzylphenyl, pyrenyl, acenaphthyl, phenalenyl, aceanthrylenyl, tetrahydronaphthyl, indanyl and biphenylyl.

As the ring to be formed by combining these hydrocarbyl groups, there may be enumerated, for example, condensation rings, such as benzene ring, naphthalene ring, acenaphthene ring and indene ring; and ring groups in which hydrogen atom(s) on such a condensation ring are substituted by an alkyl group, such as methyl, ethyl, propyl or butyl. These hydrocarbyl groups may be substituted by halogen(s).

The silicium-containing group represented by $R^1$–$R^4$ in the formula (1) may stands for a hydrocarbyl-monosubstituted silyl, such as methylsilyl or phenylsilyl; a hydrocarbyl-disubstituted silyl, such as dimethylsilyl or diphenylsilyl; a hydrocarbyl-trisubstituted silyl, such as trimethylsilyl, triethylsilyl, tripropylsilyl, tricyclohexylsilyl, triphenylsilyl, dimethylphenylsilyl, methyldiphenylsilyl, tritolylsilyl or trinaphthylsilyl; a silyl ether of a hydrocarbyl-substituted silyl, such as trimethylsilyl ether; and a silicium-substituted aryl, such as trimethylsilylphenyl.

As the oxygen-containing group represented by $R^1$ to $R^4$ in the formula (1), there may be enumerated, for example, hydroxy; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

As the sulfur-containing groups represented by $R^1$ to $R^4$ in the formula (1), there may be enumerated, for example, those in which the oxygen atom in the above-mentioned oxygen-containing groups is replaced by sulfur and sulfonate groups, such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate; and sulfinate groups, such as methyl sulfinate, phenyl sulfinate, benzene sulfinate, p-toluene sulfinate, trimethylbenzene sulfinate and pentafluorobenzene sulfinate.

As the nitrogen-containing groups represented by $R^1$ to $R^4$ in the formula (1), there may be enumerated, for example, amino group; alkylamino groups, such as methylamino, dimethylamino, diethylamino, dipropylamino, dibutylamino and dicyclohexylamino; arylamino and alkylarylamino groups, such as phenylamino, diphenylamino, ditolylamino, dinaphthylamino and methylphenylamino.

As the phosphorus-containing groups represented by $R^1$–$R^4$ in the formula (1), there may be exemplified dimethylphosphino and diphenylphosphino.

In the formula (1), $X^1$ and $X^2$ may be identical with or different from each other and may stand each for hydrogen atom, a halogen atom, a hydrocarbyl which may be substituted by halogen(s) of 1–20 carbon atoms or an oxygen- or sulfur-containing group. As the atoms or the groups for them, there may concretely be enumerated those which are given for the atoms or the groups for $R^1$–$R^4$.

In the formula (1), Y represents a divalent hydrocarbyl group which may be substituted by halogen(s) of 1–20 carbon atoms, a divalent silicium-containing group, a divalent germanium-containing group, —O—, —CO—, —S—, —SO—, —SO$_2$—, —NR$^5$—, —P(R$^5$)—, —P(O)(R$^5$)—, —BR$^5$— or —AlR$^5$— with $R^5$ being hydrogen atom, a halogen atom, a hydrocarbyl of 1–20 carbon atoms which may be substituted by halogen(s).

As the hydrocarbyl of 1–20 carbon atoms which may be substituted by halogen(s) as represented by Y in the formula (1), there may be exemplified alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene. There may further be enumerated halogenated hydrocarbyl groups, such as those in which the divalent hydrocarbyl of 1–20 carbon atoms given above are halogenated.

As the divalent silicium-containing groups represented by Y in the formula (1), there may be exemplified alkylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; alkylarylsilylenes; arylsilylenes; alkyldisilyls, such as tetramethyl-1,2-disilyl and tetraphenyl-1,2-disilyl; alkylaryldisilyls and aryldisilyls.

As the germanium-containing groups represented by Y in the formula (1), there may be exemplified those in which the silicium atom of the silicium-containing groups given above is replaced by germanium atom.

In the following, concrete examples of the transition metal compound of bridged type (a) represented by the formula (1) are given:

Bis(cyclopentadiaenyl)zirconium dichloride, bis(indenyl)zirconium dichloride, bis(fluorenyl)zirconium dichloride, bis(n-propylcyclopentadienyl)zirconium dichloride, bis(t-butylcyclopentadienyl)zirconium dichloride, bis(trimethylsilylcyclopentadienyl)zirconium dichloride, bis(neopentylcyclopentadienyl)zirconium dichloride, racdimethylsilylene-bis(1-cyclopentadienyl)zirconium dichloride, rac-dimethylsilylene-bis{1-(3-methylcyclopentadienyl)}zirconium dichloride, rac-dimethylsilylene-bis{1-(2,4-dimethylcyclopentadienyl)}zirconium dichloride, rac-dimethylsilylene-bis(1-(2,3,5-trimethylcyclopentadienyl)}zirconium dichloride and so on.

According to the present invention, amoung the transition metal compound (a) represented by the formula (1), those bridged type compounds represented by the following formula (2) are used favorably.

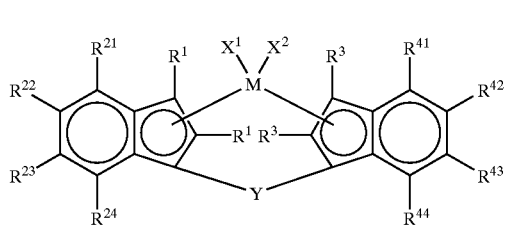

(2)

In the formula (2), M, $R^1$, $R^3$, $X^1$, $X^2$ and Y have the same meanings as defined for the formula (1) and $R^{21}$ to $R^{24}$ and $R^{41}$ to $R^{44}$ represent each hydrogen atom, a halogen atom, an alkyl group or an aryl group, wherein the alkyl and aryl groups may be substituted by halogen atom(s) or organosilyl group(s). The groups $R^{41}$ to $R^{44}$ may also form a ring by combining a part of each of the groups adjoining each other together with the carbon atoms bound thereto.

In the following, concrete examples of the transition metal compound of bridged type represented by the formula (2) are given:

rac-dimethylsilylene-bis[1-{2-n-propyl-4-(9-phenanthryl)indenyl}]zirconium dichloride, rac-ethylene-bis(1-indenyl)zirconium dichloride, rac-ethylene-bis(1-indenyl) dimethylzirconium, rac-ethylene-bis(1-indenyl) diphenylzirconium, rac-ethylene-bis(1-indenyl) methylzirconium monochloride, rac-ethylene-bis(1-indenyl)zirconium-bis(methanesufonate), rac-ethylene-bis(1-indenyl)zirconium-bis(p-toluenesufonate), rac-ethylene-bis(1-indenyl)zirconium-bis(trifluoromethanesulfonate), rac-ethylene-bis{1-(4,5,6,7-tetrahydroindenyl)}zirconium dichloride, rac-isopropylidene-bis{1-indenyl)}zirconium dichloride, rac-dimethylsilylene-bis(1-indenyl)zirconium dichloride, rac-dimethylsilylene-bis{1-(2-methylindenyl)}zirconium dichloride, rac-dimethylsilylene-bis{1-(2-methyl-4-i-propylindenyl)}zirconium dichloride, rac-dimethylsilylene-bis{1-(2,7-dimethyl-4-ethylindenyl)}zirconium dichloride, rac-dimethylsilylene-bis{1-(2,7-dimethyl-4-n-propylindenyl)}zirconium dichloride, rac-dimethylsilylene-bis{1-(2,7-dimethyl-4-i-propylindenyl)}zirconium dichloride, rac-dimethylsilylene-bis{1-(2,7-dimethyl-4-n-butylindenyl)}zirconium dichloride, rac-dimethylsilylene-bis{1-(2,7-dimethyl-4-sec-butylindenyl)}zirconium dichloride, rac-dimethylsilylene-bis{1-(2,7-dimethyl-4-t-butylindenyl)}zirconium dichloride, rac-dimethylsilylene-bis{1-(2,7-dimethyl-4-n-pentylindenyl)}zirconium dichloride, rac-dimethylsilylene-bis{1-(2,7-dimethyl-4-n-hexylindenyl)}zirconium dichloride, rac-dimethylsilylene-bis{1-(2,7-dimethyl-4-cyclohexylindenyl)}zirconium dichloride, rac-dimethylsilylene-bis{1-(2,7-dimethyl-4-methylcyclohexylindenyl)}zirconium dichloride, rac-dimethylsilylene-bis{1-(2,7-dimethyl-4-phenylethylindenyl)}zirconium dichloride, rac-dimethylsilylene-bis{1-(2,7-dimethyl-4-phenyldichloromethylindenyl)}zirconium dichloride, rac-dimethylsilylene-bis{1-(2,7-dimethyl-4-chloromethylindenyl)}zirconium dichloride, rac-dimethylsilylene-bis{1-(2,7-dimethyl-4-trimethylsilylenemethylindenyl)}zirconium dichloride, rac-dimethylsilylene-bis{1-(2,7-dimethyl-4-trimethylsiloxymethylindenyl)}zirconium dichloride, rac-diethylsilylene-bis{1-(2,7-dimethyl-4-i-propylindenyl)}zirconium dichloride, rac-di(i-propyl)silylene-bis{1-(2,7-dimethyl-4-i-propylindenyl)}zirconium dichloride, rac-di(n-butyl)silylene-bis{1-(2,7-dimethyl-4-i-propylindenyl)}zirconium dichloride, rac-di(cyclohexyl)silylene-bis{1-(2,7-dimethyl-4-i-propylindenyl)}-zirconium dichloride, rac-methylphenylsilylene-bis{1-(2,7-dimethyl-4-i-propylindenyl)}zirconium dichloride, rac-methylphenylsilylene-bis{1-(2,7-dimethyl-4-t-butylindenyl)}zirconium dichloride, rac-diphenylsilylene-bis{1-(2,7-dimethyl-4-t-butylindenyl)}zirconium dichloride, rac-diphenylsilylene-bis{1-(2,7-dimethyl-4-i-propylindenyl)}zirconium dichloride, rac-diphenylsilylene-bis{1-(2,7-dimethyl-4-ethylindenyl)}zirconium dichloride, rac-di-(p-tolyl)silylene-bis{1-(2,7-dimethyl-4-i-propylindenyl)}zirconium dichloride, rac-di-(p-chlorophenyl)silylene-bis{1-(2,7-dimethyl-4-i-propylindenyl)}zirconium dichloride, rac-dimethylsilylene-bis{1-(2-methyl-4-i-propyl-7-ethylindenyl)}zirconium dibromide, rac-dimethylsilylene-bis{1-(2,7-dimethyl-4-i-propyl-1-indenyl)zirconiumdimethyl, rac-dimethylsilylene-bis{1-(2,7-dimethyl-4-i-propyl-1-indenyl)zirconiummethyl chloride, rac-dimethylsilylene-bis{1-(2,7-dimethyl-4-i-propyl-1-indenyl)zirconium-bis{1-(trifluromethanesulfonate), rac-dimethylsilylene-bis{1-(2,7-dimethyl-4-i-propyl-1-indenyl)zirconium-bis{1-(p-phenylsulfinate), rac-dimethylsilylene-bis{1-(2-phenyl-4-i-propyl-7-methyl-1-indenyl)zirconium dichloride, rac-dimethylsilylene-bis(1,2-dihydroacenaphthylo(4,5-b)cyclopentadienyl)zirconium dichloride, rac-dimethylsilylene-bis(benzo(e)indenyl)zirconium chloride, rac-dimethylsilylene-bis{1-(4-phenylindenyl)}zirconium dichloride, rac-dimethylsilylene-bis{1-(2-methyl-4-phenylindenyl)}zirconium dichloride, rac-dimethylsilylene-bis-(1-{2-methyl-4-(α-naphthyl)indenyl})zirconium dichloride, rac-dimethylsilylene-bis(1-{2-methyl-4-(β-naphthyl)indenyl})zirconium dichloride, rac-dimethylsilylene-bis(1-{2-methyl-4-(1-anthracenyl)indenyl})zirconium dichloride, rac-dimethylsilylene-bis(1-{2-methyl-4-(2-anthracenyl)indenyl})zirconium dichloride, rac-dimethylsilylene-bis(1-{2-methyl-4-(9-anthracenyl)indenyl})zirconium dichloride, rac-dimethylsilylene-bis(1-{2-methyl-4-(9-phenanthryl)indenyl})zirconium dichloride, rac-dimethylsilylene-bis(1-{2-methyl-4-(p-fluorophenyl)indenyl})zirconium dichloride, rac-dimethylsilylene-bis(1-{2-methyl-4-(pentafluorophenyl)indenyl}]zirconium dichloride, rac-dimethylsilylene-bis(1-{2-methyl-4-(p-chlorophenyl)indenyl})zirconium dichloride, rac-dimethylsilylene-bis(1-{2-methyl-4-(m-chlorophenyl)indenyl})zirconium dichloride, rac-dimethylsilylene-bis(1-{2-methyl-4-(o-chlorophenyl)indenyl})zirconium dichloride, rac-dimethylsilylene-bis(1-{2-methyl-4-(o,p-dichlorophenyl)phenyl-1-indenyl})zirconium dichloride, rac-dimethylsilylene-bis(1-{2-methyl-4-(p-bromophenyl)indenyl})zirconium dichloride, rac-dimethylsilylene-bis(1-{2-methyl-4-(p-tolyl)indenyl})zirconium dichloride, rac-dimethylsilylene-bis(1-{2-methyl-4-(m-tolyl)indenyl})zirconium dichloride, rac-dimethylsilylene-bis(1-{2-methyl-4-(o-tolyl)indenyl})zirconium dichloride, rac-dimethylsilylene-bis(1-{2-methyl-4-(o,o'-dimethylphenyl)-1-indenyl})zirconium dichloride, rac-dimethylsilylene-bis (1-{2-methyl-4-(p-ethyl-phenyl)indenyl})zirconium dichloride, rac-dimethyl silylene-bis(1-{2-methyl-4-(p-i-propylphenyl)indenyl})zirconium dichloride, rac-dimethylsilylene-bis(1-{2-methyl-4-(p-benzylphenyl)indenyl})zirconium dichloride, rac-dimethylsilylene-bis(1-{2-methyl-4-(p-biphenyl)indenyl})zirconium dichloride, rac-dimethylsilylene-bis(1-{2-methyl-4-(m-biphenyl)indenyl)}zirconium dichloride, rac-dimethylsilylene-bis(1-{2-methyl-4-(p-trimethylsilylene)phenyl)indenyl})zirconium dichloride, rac-dimethylsilylene-bis(1-{2-methyl-4-(m-trimethylsilylenephenyl)indenyl})zirconium dichloride, rac-dimethylsilylene-bis(2-phenyl-4-phenylindenyl)}zirconium dichloride, rac-dimethylsilylene-bis{1-(2-methyl-4-phenylindenyl)}zirconium dichloride, rac-dimethylsilylene-bis{1-(2-methyl-4-phenylindenyl)}zirconiumdimethyl, rac-dimethylsilylene-bis{1-(2-methyl-4-phenylindenyl)}zirconiummethyl chloride, rac-dimethylsilylene-bis{-1-(2-methyl-4-phenylindenyl)}zirconium chloride $SO_2Me$, rac-dimethylsilylene-bis{1-(2-methyl-4-phenylindenyl)}zirconium chloride $OSO_2Me$, rac-dimethylsilylene-bis{1-(2-methyl-4-phenylindenyl)}zirconium monochloride mono(trifluoromethanesulfonate), rac-dimethylsilylene-bis{1-(2-methyl-4-phenylindenyl)}zirconium di(trifluoromethanesulfonate), rac-dimethylsilylene-bis{1-(2-methyl-4-phenylindenyl)}zirconium di-(p-toluenesulfonate), rac-dimethylsilylene-bis{1-(2-methyl-4-phenylindenyl)}zirconium di-(methylsulfonate), rac-dimethylsilylene-bis{1-(2-methyl-4-phenylindenyl)}zirconium di(trifluoromethane sulfinate), rac-dimethylsilylene-bis{1-(2-methyl-4-phenylindenyl)}zirconium di(trifluoroacetate), rac-dimethylsilylene-bis{1-(2-methyl-4-phenylindenyl)}zirconium monochloride (n-butoxide), rac-dimethylsilylene-bis{1-(2-methyl-4-phenylindenyl)}zirconium di-(butoxide), rac-dimethylsilylene-bis{1-(2-methyl-4-phenylindenyl)}zirconium monochloride (phenoxide), rac-methylene-bis{1-(2 -methyl-4-phenylindenyl)}zirconium dichloride, rac-ethylene-bis{1-(2-methyl-4-phenylindenyl)}zirconium dichloride, rac-di-(i-propyl)silylene-bis{1-(2-methyl-4-phenylindenyl)}zirconium dichloride, rac-di-(n-butyl)silylene-bis{1-(2-methyl-4-phenylindenyl)}zirconium dichloride, rac-dicyclohexylsilylene-bis{1-(2-methyl-4-phenylindenyl)}zirconium dichloride, rac-methylphenylsilylene-bis{1-(2-methyl-4-phenylindenyl)}zirconium dichloride, rac-diphenylsilylene-bis{1-(2-methyl-4-phenylindenyl)}zirconium dichloride, rac-di-(p-tolyl)silylene-bis{1-(2-methyl-4-phenylindenyl)}zirconium dichloride, rac-di-(p-chlorophenyl)silylene-bis{1-(2-methyl-4-phenylindenyl)}zirconium dichloride, rac-dimethylgermylene-bis{1-(2-methyl-4-phenylindenyl)}zirconium dichloride, rac-dimethylstannylene-bis-{1-(2-methyl-4-phenylindenyl)}zirconium dichloride, rac-dimethylsilylene-bis{-(2-ethyl-4-phenylindenyl))}zirconium dichloride, rac-dimethylsilylene-bis(1-{2-ethyl-4-(α-naphthyl)indenyl})zirconium dichloride, rac-dimethylsilylene-bis(1-{2-ethyl-4-(β-naphthyl)indenyl})zirconium dichloride, rac-dimethylsilylene-bis(1-{2-ethyl-4-(2-methyl-1-naphthyl)indenyl})zirconium dichloride, rac-dimethylsilylene-bis(1-{2-ethyl-4-(5-acenaphthyl)indenyl})zirconium dichloride, rac-dimethylsilylene-bis(1-{2-ethyl-4-(9-anthracenyl)indenyl})zirconium dichloride, rac-dimethylsilylene-bis(1-{2-ethyl-4-(9-phenanthryl)indenyl})zirconium dichloride, rac-dimethylsilylene-bis(1-{2-ethyl-4-(o-methylphenyl)indenyl})zirconium dichloride, rac-dimethylsilylene-bis(1-{2-ethyl-4-(m-methylphenyl)indenyl})zirconium dichloride, rac-dimethylsilylene-bis(1-{2-ethyl-4-(p-methylphenyl)indenylenyl})zirconium dichloride, rac-dimethylsilylene-bis(1-{2-ethyl-4-(2,3-dimethylphenyl)indenyl})zirconium dichloride, rac-dimethylsilylene-bis(1-{2-ethyl-4-(2,4-dimethylphenyl)indenyl})zirconium dichloride, rac-dimethylsilylene-bis(1-{2-ethyl-4-(2,5-dimethylphenyl)indenyl})zirconium dichloride, rac-dimethylsilylene-bis(1-{2-ethyl-4-(2,4,6-trimethylphenyl)indenyl})zirconium dichloride, rac-dimethylsilylene-bis(1-{2-ethyl-4-(o-chlorophenyl)indenyl})zirconium dichloride, rac-dimethylsilylene-bis(1-{2-ethyl-4-(m-chlorophenyl)indenyl})zirconium dichloride, rac-dimethylsilylene-bis(1-{2-ethyl-4-(p-chlorophenyl)indenyl})zirconium dichloride, rac-dimethylsilylene-bis(1-{2-ethyl-4-(2,3-dichlorophenyl)indenyl})zirconium dichloride, rac-dimethylsilylene-bis(1-{2-ethyl-4-(2,6-dichlorophenyl)indenyl})zirconium dichloride, rac-dimethylsilylene-bis(1-{2-ethyl-4-(3,5-dichlorophenyl)indenyl})zirconium dichloride, rac-dimethylsilylene-bis(1-{2-ethyl-4-(2-bromophenyl)indenyl})zirconium dichloride, rac-dimethylsilylene-bis-(1-{2-ethyl-4-(3-bromophenyl)indenyl})zirconium dichloride, rac-dimethylsilylene-bis(1-{2-ethyl-4-(4-bromophenyl)indenyl})zirconium dichloride, rac-dimethylsilylene-bis(1-{2-ethyl-4-(4-biphenylyl)indenyl})zirconium dichloride, rac-dimethylsilylene-bis(1-{2-ethyl-4-(4-trimethylsilylenephenyl)indenyl})zirconium dichloride, rac-dimethylsilylene-bis{1-(2-n-propyl-4-phenylindenyl)}zirconium dichloride, rac-dimethylsilylene-bis(1-{2-n-propyl-4-(α-naphthyl)indenyl})zirconium dichloride, rac-dimethylsilylene-bis(1-{2-n-propyl-4-(β-naphthyl)indenyl})zirconium dichloride, rac-dimethylsilylene-bis(1-{2-n-propyl-4-(2-methyl-1-naphthyl)indenyl})zirconium dichloride, rac-dimethylsilylene-bis(1-{2-n-propyl-4-(5-acenaphthyl)indenyl})zirconium dichloride, rac-dimethylsilylene-bis(1-{2-n-propyl-4-(9-anthracenyl)indenyl})zirconium dichloride, rac-dimethylsilylene-bis(1-{2-n-propyl-4-(9-phenanthryl)indenyl})zirconium dichloride, rac-dimethylsilylene-bis-{1-(2-i-propyl-4-phenylindenyl)}zirconium dichloride, rac-dimethylsilylene-bis(1-{2-i-propyl-4-(α-naphthyl)indenyl})zirconium dichloride, rac-dimethylsilylene-bis-(1-{2-i-propyl-4-(β-naphthyl)indenyl})zirconium dichloride, rac-dimethylsilylene-bis(1-{2-i-propyl-4-(2-methyl-1-naphthyl)indenyl})zirconium dichloride, rac-dimethylsilylene-bis(1-{2-i-propyl-4-(5-acenaphthyl)indenyl})zirconium dichloride, rac-dimethylsilylene-bis(1-{2-i-propyl-4-(9-anthracenyl)indenyl})zirconium dichloride, rac-dimethylsilylene-bis(1-{2-i-propyl-4-(9-phenanthryl)indenyl})zirconium dichloride, rac-dimethylsilylene-bis{1-(2-s-butyl-4-phenylindenyl)}zirconium dichloride, rac-dimethylsilylene-bis(1-{2-s-butyl-4-(α-naphthyl)indenyl})zirconium dichloride, rac-dimethylsilylene-bis(1-{2-s-butyl-4-(β-naphthyl)indenyl})zirconium dichloride, rac-dimethylsilylene-bis(1-{2-s-butyl-4-(8-methyl-9-naphthyl)indenyl})zirconium dichloride, rac-dimethylsilylene-bis(1-{2-s-butyl-4-(5-acenaphthyl)indenyl})zirconium dichloride, rac-dimethylsilylene-bis(1-{2-s-butyl-4-(9-anthracenyl)indenyl})zirconium dichloride, rac-dimethylsilylene-bis(1-{2-s-butyl-4-(9-phenanthryl)indenyl})zirconium dichloride, rac-dimethylsilylene-bis-{1-(2-n-pentyl-4-phenylindenyl)}zirconium dichloride, rac-dimethylsilylene-bis(1-{2-n-pentyl-4-(α-naphthyl)indenyl})zirconium dichloride, rac-dimethylsilylene-bis-{1-(2 -n-butyl-4-phenylindenyl)}zirconium dichloride, rac-dimethylsilylene-bis-(1-{2-n-butyl-4-(α-naphthyl)indenyl})zirconium dichloride, rac-dimethylsilylene-bis-(1-{2-n-butyl-4-(βnaphthyl)indenyl})zirconium dichloride, rac-dimethylsilylene-bis(1-{2-n- butyl-4-(2-methyl-1-naphthyl)indenyl})zirconium dichloride, rac-dimethylsilylene-bis(1-{2-n-butyl-4-(5-acenaphthyl)indenyl})zirconium dichloride, rac-dimethylsilylene-bis(1-{2-n-butyl-4-(9-anthracenyl) indenyl})zirconium dichloride, rac-dimethylsilylene-bis(1-{2-n-butyl-4-(9-phenanthryl)indenyl})zirconium dichloride, rac-dimethylsilylene-bis(1-{2-i-butyl-4-(9-phenanthryl)indenyl})zirconium dichloride, rac-dimethylsilylene-bis(-1-{2-i-butyl-4-(α-naphthyl)indenyl}) zirconium dichloride, rac-dimethylsilylene-bis(1-{2-i-butyl-4-(β-naphthyl)indenyl})zirconium dichloride, rac-dimethylsilylene-bis(1-{2-i-butyl-4-(2-methyl-1-naphthyl) indenyl})zirconium dichloride, rac-dimethylsilylene-bis(1-{2-i-butyl-4-(5-anthracenyl)indenyl})zirconium dichloride, rac-dimethylsilylene-bis(1-{2-i-butyl-4-(9-anthracenyl) indenyl})zirconium dichloride, rac-dimethylsilylene-bis(1-{2-i-butyl-4-(9-phenanthryl)indenyl})zirconium dichloride, rac-dimethylsilylene-bis-{1-(2-neopentyl-4-phenylindenyl) }zirconium dichloride, rac-dimethylsilylene-bis-(1-{2-neopentyl-4-(α-naphthyl)indenyl})zirconium dichloride, rac-dimethylsilylene-bis{1-(2-n-hexyl-4-phenylindenyl)}) zirconium dichloride, rac-dimethylsilylene-bis-(1-{2-n-hexyl-4-(α-naphthyl)indenyl})zirconium dichloride, rac-methylphenylsilylene-bis{1-(2-ethyl-4-phenylindenyl}) zirconium dichloride, rac-methylphenylsilylene-bis-(1-{2-ethyl-4-(α-naphthyl)-indenyl})zirconium dichloride, rac-methylphenylsilylene-bis(1(1-{2-ethyl-4-(9-anthracenyl) indenyl})zirconium dichloride, rac-methylphenylsilylene-bis(1-{2-ethyl-4-(9-phenanthryl)indenyl})zirconium dichloride, rac-diphenylsilylene-bis{1-(2-ethyl-4-phenylindenyl)}zirconium dichloride, rac-diphenylsilylene-bis(1-{2-ethyl-4-(α-naphthyl)indenyl})zirconium dichloride, rac-diphenylsilylene-bis(1-{2-ethyl-4-(9-anthracenyl)indenyl})zirconium dichloride, rac-diphenylsilylene-bis(1-{2-ethyl-4-(9-phenanthryl)indenyl} }zirconium dichloride, rac-diphenylsilylene-bis(1-{2-ethyl-4-(4-biphenylyl)indenyl})zirconium dichloride, rac-methylene-bis{1-(2-ethyl-4-phenylindenyl})zirconium dichloride, rac-methylene-bis(1-{2-ethyl-4-α-naphthyl) indenyl})zirconium dichloride, rac-ethylene-bis{1-(2-ethyl-4-phenylindenyl})zirconium dichloride, rac-ethylene-bis(1-{2-ethyl-4-(α-naphthyl)indenyl})zirconium dichloride, rac-ethylene-bis(1-{2-n-propyl-4-(α-naphthyl)indenyl}) zirconium dichloride, rac-dimethylgermylene-bis{1-(2-ethyl-4-phenylindenyl)}zirconium dichloride, rac-dimethylgermylene-bis(-1-{2-ethyl-4-(α-naphthyl) indenyl})zirconium dichloride, rac-dimethylgermylene-bis{1-(2-n-propyl-4-phenylindenyl)}zirconium dichloride, rac-dimethylstannylene-bis{1-(2-ethyl-4-phenylindenyl) }zirconium dichloride, rac-dimethylstannylene-bis-(1-{2-ethyl-4-(α-naphthyl)indenyl})zirconium dichloride, rac-dimethylstannylene-bis(1-{2-n-ethyl-4-(9-phenanthryl) indenyl})zirconium dichloride, rac-dimethylstannylene-bis{1-(2-n-propyl-4-phenylindenyl)}zirconium dichloride and so on.

Further, there may be exemplified transition metal compounds in which the zirconium atom in the above-mentioned transition metal compounds is replaced with titanium atom, hafnium atom, vanadium atom, niobium atom, tantalum atom, chromium atom, molybdenum atom or wolfram atom.

In general, the transition metal compound (a) is incorporated as a component for the catalyst for polymerizing olefins in the form of racemic body, while an R-type or S-type compound (a) may also be utilized. According to the present invention, a plurality of the above-mentioned transition metal compounds (a) can be used in combination.

According to the present invention, at least one compound selected from the group consisting of (b) organoaluminum compounds, (c) organoaluminum oxy-compounds and (d) ionizing ionic compounds, as activator capable of activating the above-mentioned transition metal compounds (a).

The organoaluminum compound (b) is represented, for example, by the following formula (3):

$(R^1)_n AlX_{3-n}$ (3)

in which $R^1$ is a hydrocarbon group having 1–12 carbon atoms, X denotes a halogen atom or hydrogen atom and n is an integer of 1–3.

In the formula (3), $R^1$ represents a hydrocarbon group having 1–12 carbon atoms, such as alkyl, cycloalkyl or aryl and, concretely, it stands for methyl, ethyl, n-propyl, isopropyl, isobutyl, pentyl, hexyl, octyl, cyclopentyl, cyclohexyl, phenyl or tolyl.

Concrete examples of such an organoaluminum compound (b) include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum and so on; dialkylaluminum halides, such as dimethylaluminum chloride, diethylaluminum chloride, diisopropylaluminum chloride, diisobutylaluminum chloride and dimethylalumunim bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

It is permissible to use, as the organoaluminum compound (b), also the compounds represented by the following formula (4):

$(R^1)_n AlY_{3-n}$ (4)

in which $R^1$ is the same as $R^1$ in the formula (3), Y denotes a group of $-OR^2$, $-OSi(R^3)_3$, $-OAl(R^4)_2$, $-N(R^5)_2$, $-Si(R^6)_3$ or $-N(R^7)Al(R^8)_2$ and n is a number of 1–2, wherein $R^2$, $R^3$, $R^4$ and $R^8$ denote each methyl, ethyl, isopropyl, isobutyl, cyclohexyl or phenyl, $R^5$ denotes hydrogen atom, methyl, ethyl, isopropyl, phenyl or trimethylsilyl and $R^6$ and $R^7$ represent each methyl, ethyl or the like.

Concretely, there may be enumerated the following compounds:
1) Compounds represented by $(R^1)_n Al(OR^2)_{3-n}$, for example, dimethylaluminum methoxide, diethylaluminum ethoxide and diisobutylaluminum methoxide
2) Compounds represented by $(R^1)_n Al\{OSi(R^3)_3\}_{3-n}$, for example, $Et_2Al(OSiMe_3)$, $(iso-Bu)_2Al(OSiMe_3)$ and $(iso-Bu)_2Al(OSiEt_3)$
3) Compounds represented by $(R^1)_n Al\{OAl(R^4)_2\}_{3-n}$, for example, $Et_2AlOAlEt_2$, and $(iso-Bu)_2AlOAl(iso-Bu)_2$
4) Compounds represented by $(R^1)_n Al\{N(R^5)_2\}_{3-n}$, for example, $Me_2AlNEt_2$, $Et_2AlNHMe$, $Me_2AlNHEt$, $Et_2AlN(SiMe_3)_2$ and $(iso-Bu)_2AlN(SiMe_3)_2$
5) Compounds represented by $(R^1)_n Al\{Si(R^6)_3\}_{3-n}$, for example, $(iso-Bu)_2AlSiMe_3$ and the like
6) Compounds represented by $(R^1)_n Al\{N(R^7)Al(R^8)_2\}_{3-n}$, for example, $Et_2AlN(Me)AlEt_2$ and $(iso-Bu)_2AlN(Et)Al(iso-Bu)_2$ In the above, Me represents methyl group, Et denotes ethyl group and Bu represents butyl group.

Among them, compounds represented by the formulae $(R^1)_3Al$, $(R^1)_n Al\ OR^2)_{3-n}$ and $(R^1)_n Al\{OAl(R^4)_2\}_{3-n}$ are preferred, wherein special preference is given to those compounds in which R denotes an iso-alkyl and n is 2. It is permissible to use them in a combination.

The organoaluminum compounds (c) may be known aluminoxanes soluble in benzene or may be organoaluminum oxy-compounds insoluble in benzene disclosed in Japanese Patent Kokai Hei-2-276807 A.

The aluminoxane can be prepared, for example, by the methods given below:

(1) A method in which an organoaluminum compound, such as trialkylaluminum, is added to a suspension of a salt containing adsorbed moisture or water of cristallization, such as hydrated salt of magnesium chloride, copper sulfate, aluminum sulfate, nickel sulfate or cerous chloride, in a hydrocarbon solvent, to cause a reaction.
(2) A method in which an organoaluminum compound, such as trialkylaluminum, is reacted directly with water, ice or steam in a medium, such as benzene, toluene, ethyl ether or tetrahydrofuran.
(3) A method in which an organoaluminum compound, such as trialkylaluminum, is reacted with an organotin oxide, such as dimethyltin oxide or dibutyltin oxide, in a medium, such as decane, benzene or toluene.

These aluminoxanes may contain a small amount of organometallic component(s). They may be re-dissolved in a solvent, after the reaction solvent or the unreacted organoaluminum compound has been removed from the recovered aluminoxane solution by distillation.

As the organoaluminum compound to be used on the preparation of the aluminoxane, concretely, those exemplified above for the organoaluminum compound (b) may be enumerated. Among them, special preference is given to trialkylaluminums and tricycloalkylaluminums.

As the solvent used in the preparation of the aluminoxane, there may be exemplified aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum cut fractions, such as gasoline, kerosene and gas oil; and halogenated hydrocarbons, especially those chlorinated or brominated products of the aromatic, aliphatic and alicyclic hydrocarbons given above. Other solvents, for example, ethers, such as ethyl ether and tertahydrofuran may also be used. Among these solvents, especially aromatic hydrocarbons are preferred.

The organoaluminum oxy-compounds to be used according to the present invention is insoluble or difficultly soluble in benzene and have an Al component soluble in benzene at 60° C. of 10% or less, preferably 5% or less and especially preferably 2% or less, calculated as aluminum atom.

The solubility of the organoaluminum compound is determined by suspending such an amount of the organoaluminum compound as corresponding to 100 mg of aluminum atom in 100 ml of benzene and mixing the resulting suspension at 60° C. with stirring for 6 hours, before subjecting the suspension to hot filteration at 60° C. through a G-5 glass filter with four times washings of the solid residue retained on the glass filter with each 50 ml of benzene of 60° C. and, then, determining the amount of aluminum atom in the total filtrate (X mmol corresponding to X %).

The ionizing ionic compound (d) serves for reacting with the transition metal compound (a) represented by the formula (1) to form an ion pair. For the ionizing ionic compound (d), there may be exemplified Lewis acids, ionic compounds and carboranes as disclosed in, for example, Japanese Patent Kokais Hei-1-501950 A, Hei-1-502036 A, Hei-3-179005 A, Hei-3-179006 A, Hei-3-207703 A, Hei-3-207704 A and U.S. Pat. No. 5,321,106.

As the Lewis acid, there may be enumerated, for example, triphenylboron, tris(4-fluorophenyl)boron, tris(p-tolyl) boron, tris(o-tolyl)boron, tris(3,5-dimethylphenyl)boron, tris(pentafluorophenyl)boron, $MgCl_2$, $Al_2O_3$ and $SiO_2$—$Al_2O_3$.

As the ionic compound, there may be enumerated for example, triphenylcarbenium tetrakis(pentafluorophenyl) borate, tri-n-butylammonium tetrakis(pentafluorophenyl) borate, N,N-dimethylammonium tetrakis (pentafluorophenyl)borate and ferrocenium tetra (pentafluorophenyl)boron.

As the carboranes, there may be enumerated, for example, dodecaborane, 1-carbaundecaborane, bis-n-butylammonium (1-carbedodeca)borate, tri-n-butylammonium-(7,8-dicarbaundeca)borate, and tri-n-butylammonium-(tridecahydrido-7-carbaundeca)borate.

These ionizing ionic compounds (d) may be used alone or in a combination of two or more of them. It is possible to use, as the activator for activating the transition metal compound (a), the above-mentioned components (b), (c) and (d) in a combination.

The metallocene catalyst can be prepared by mixing at least one activator compound selected from the group consisting of the above-mentioned compounds (b) to (d), together with the transition metal compound (a) in an inert hydrocarbon solvent or olefin solvent.

As the inert hydrocarbon solvent to be used in the preparation of the catalyst based on metallocene, there may be exemplified aliphatic hydrocarbons, such as propane, butane, pentane, hexane, heptane, octane, decane, dodecane and hexadecane; alicyclic hydrocarbons, such as cyclopentane, cyclohexane, methylcyclopentane, and cyclooctane; aromatic hydrocarbons, such as benzene, toluene and xylene; halogenated hydrocarbons, such as ethylene chloride, chlorobenzene and dichloromethane; petroleum cut fractions, such as gasoline, kerosene and gas oil; and mixture of them.

Upon the preparation of the metallocene from these components, the transition metal compounds may favorably be used usually at a concentration of about $10^{-8}$–$10^{-1}$ mole/liter (of polymerization volume), preferably $10^{-7}$–$5 \times 10^{-2}$ mole/liter.

When the component (b) and/or (c) is used as the activator component, the component (b) and/or (c) may favorably be used usually in an amount of 10–10,000, preferably 20–5,000 in the atomic ratio of aluminum to the transition metal of the tansition metal compound (a) (i.e. Al/transition metal). When the organoaluminum compound (b) and the organoaluminum oxy-compound (c) are used concurrently, it is favorable to use them in such an amount that the atomic ratio (Al-1/Al-2) of aluminum atom (Al-1) in the component (b) to the aluminum atom (Al-2) in the component (c) will be in the range of 0.02–3, preferably 0.05–1.5.

When the ionizing ionic compound (d) is used, it may be used usually in such an amount that the mole ratio of the transition metal (a) to the component (d), namely, (a)/(d) will be in the range of 0.01–10, preferably 0.1–5.

These catalyst components may either be mixed in the polymerization reactor or be added to the polymerization reactor in a preliminarily mixed blend. When these components are blended preliminarily, the monomers may be contacted therewith usually at a temperature of −50 to +150° C., preferably −20 to +120° C., for a duration of 1 minute to 50 hours, preferably 5 minutes to 25 hours. In the case of mixing contact, the mixing temperature may be varied.

The metallocene catalyst may be a solid catalyst having either one or all of the above-mentioned components (a) to (d) supported on a granular or fine particulate solid material (carrier).

The carrier may be of organic or inorganic material. For the inorganic carrier, porous oxides are used preferably, for example, $SiO_2$ and $Al_2O_3$. For the organic carrier, a polymer resin, such as homopolymer or copolymer constituted mainly of an α-olefin having 2–14 carbon atoms, such as ethylene, propylene, 1-butene or 4-methyl-1-pentene, and homo- and copolymer resins constituted mainly of vinylcyclohexane and/or styrene may be used.

The metallocene catalyst may also be used after a prepolymer catalyst has been formed by causing each of the catalyst components to be introduced into a prepolymerization of an olefin. For the α-olefin to be subjected to such prepolymerization, there may be employed, for example, propylene, ethylene and 1-butene, wherein they may be used in combination with other olefins.

On preparing the metallocene-based catalyst, component (s) useful for polymerization of olefin other than the catalyst components mentioned above can be incorporated, for example, water as a catalyst component.

The ethylene/α-olefin random copolymer (B) and the the propylene/ethylene/1-butene random copolymer (C) can be produced by co-polymerizing ethylene with the α-olefin, on the one hand, and propylene with 1-butene and ethylene, on the other hand respectively, in the presence of the above-mentioned metallocene catalyst.

The polymerization can be realized either in a liquid phase polymerization, such as suspension polymerization and solution polymerization, or in a gas phase polymerization. In a liquid phase polymerization, the same inert solvent used in the preparation of the catalyst can be used and, further, α-olefins, such as propylene and so on, may also be employed.

When the polymerization is carried out in a suspension polymerization, it is favorable to effect the polymerization at a temperature of −50 to +100° C., preferably 0 to 90° C., whereas when the polymerization is carried out in a solution polymerization, it is favorable to choose the polymerization temperature in the range of 0–250° C., preferably 20–200° C. When a gas phase polymerization is to be employed, the polymerization may favorably be carried out at a temperature of 0–120° C., preferably 20–100° C., under a pressure in the range from normal pressure to 9.8 MPa (100 kgf/cm$^2$, gauge), prefkably from normal pressure to 4.9 MPa (50 kgf/cm$^2$, gauge).

The polymerization can be effected either in a batch-wise process, in a semi-continuous process or in a continuous process. It is possible to effect the polymerization in two or more successive steps to be performed each under a different condition. The molecular weight of the resulting copolymer can be adjusted by, for example, effecting the polymerization under incorporation of hydrogen gas or under alteration of condition of temperature or pressure.

The polypropylene resin composition according to the present invention comprises the polypropylene resin (A) in an amount of 50–95 parts by weight, the ethylene/α-olefin random copolymer (B) in an amount of 3–40 parts by weight and the propylene/ethylene/1-butene random copolymer in an amount of 2–20 parts by weight and preferably the polypropylene resin (A) in an amount of 60–92 parts by weight, the ethylene/α-olefin random copolymer (B) in an amount of 5–30 parts by weight and the propylene/ethylene/ 1-butene random copolymer (C) in an amount of 3–10 parts by weight, wherein the total amount of these three components (A), (B) and (C) sums up to 100 parts by weight.

The polypropylene resin composition according to the present invention may contain in addition to the polypropylene (A), the ethylene/α-olefin random copolymer (B) and the propylene/ethylene/1-butene random copolymer (C) other ingredient(s), such as additives and other polymer(s), within the limit not obstructing the inventive advantages of the resin composition according to the present invention.

As the additives, there may be incorporated weather resistant agent, heat stabilizer, antifogging agent, antiblocking agent, slipping agent, lubricant, antistatic agent, fire retardant, pigments, dyestuffs and filler.

The polypropylene resin composition according to the present invention can be produced by a method known in general, for example, by melt-kneading the polypropylene (A), the ethylene/α-olefin random copolymer (B) and the propylene/ethylene/1-butene random copolymer (C) as well as other ingredient(s) to be incorporated optionally.

For example, the polypropylene resin composition according to the present invention can be prepared by charging an adequate mixing device, such as Henschel mixer, V-shaped mixer, tumbler mixer or ribbon blender, with the above-mentioned components and ingredients all at once or successively and mixing them therein, followed by melt-kneading the resulting mixture on, for example, monoaxial or multiaxial extruder, kneader, Bumbury's mixer.

The polypropylene resin composition according to the present invention may favorably have an MFR, determined according to ASTM D-1238 at 230° C. under a load of 2.16 kg, in the range of 1 to 100 g/10 min., in particular, 1 to 50 g/10 min.

The melting point (determined by DSC method) of the polypropylene resin composition according to the present invention may favorably be in the range of 100–167° C., in particular 120–167° C.

The polypropylene resin composition can be processed into non-stretched films by extrusion molding known per se. The non-stretched films obtained by extrusion molding are superior in the transparency, in the impact resistence, in the low temperature heat-sealability and in the heat-sealing strength, so that they are suitable for using as monolayer non-stretched films.

The non-stretched film according to the present invention is produced by subjecting the polypropylene resin composition described above to a film-forming by extrusion molding.

The thickness of the non-stretched film according to the present invention may usually be in the range of 10–100 μm, preferably 20–80 μm, though there may be variations depending on each specific use.

The non-stretched film according to the present invention can be utilized in packaging field, for example, for packaging foods including perishable foods, such as vegetables and fish meals; dry foods, such as snack and dry noodle; and wetty foods, such as soup and pickles; for packaging medical products including medicaments, such as tablet, powder, solution etc., and medical utensils; for packaging electric and electronic products including instrumental parts, cassettes and so on.

The extrusion molding for producing the non-stretched film according to the present invention may be realized by proper selection of the apparatus and processing conditions among those known previously for extrusion-molding a polypropylene resin or polypropylene resin composition.

As described above, the polypropylene resin composition according to the present invention can be processed into a non-stretched film which is superior in the transparency, impact resistance, heat sealability at low temperature and heat sealing strength, since it has specific components, namely, the polypropylene resin (A), the ethylene/α-olefin random copolymer (B) and the propylene/ethylene/1-butene random copolymer (C) in a special proportion.

THE BEST MODE FOR EMBODYING THE INVENTION

Below, the present invention will further be described by way of Examples and Comparative Example, wherein these Examples are not given for restricting the present invention in any respect.

The values of evaluations given in Examples and Comparative Example are based on the following schemes:
(1) Heat-Sealing Strength:
   The heat-sealing strength (peeling strength) was determined in accordance with the method prescribed in JIS Z 1707 under the conditions:
   Sealing pressure: 0.2 MPa
   Duration of sealing operation: 1 second
   Peeling speed 300 mm/min.
   (2) Impact Resistance:
The film impact strength was observed as a parameter of the impact resistance and determined in accordance with the method prescribed in JIS P8134. The testing machine has a capacity of 30 kg/cm·cm and an impact head of ½ inch φ.
(3) Transparency:
   The haze was observed as a parameter of the transparency in accordance with the method prescribed in ASTM D 1003.
(4) Gloss:
   The gloss was determined in accordance with the method prescribed in ASTM D 523.

Production Example 1

Production of Ethylene/α-olefin Random Copolymer (B)

An ethylene/1-butene random copolymer was produced using a metallocene catalyst. Thus, a two liter autoclave replaced sufficiently by nitrogen gas was charged with 950 ml of hexane and 50 g of 1-butene, whereto was added 1 mmol of triisobutylaluminum. The autoclave was heated at 70° C. and was supplied with ethylene until a total pressure of 0.7 MPa (7 kgf/cm$^2$, gauge) was reached, whereto were added 0.30 mmol of methylaluminoxane and 0.001 mmol, calculated as Zr atom, of rac-dimethylsilylene-bis(1-{2-n-propyl-4-(9 -phenanthryl)indenyl})zirconium dichloride, whereupon ethylene was replenished thereto succesively while maintaining the total pressure of 0.7 MPa (7 kgf/cm$^2$, gauge) in order to proceed the polymerization for 30 minutes.

After the polymerization, the internal gas was evacuated and the resulting polymer was recovered in a plentiful amount of methanol, whereupon the polymer was dried under a reduced pressure at 110° C. for 12 hours. The resulting polymer {a branched long chain ethylene/1-butene random copolymer (B-1)} amounted 28.0 g and the polymerization activity was calculated to be 56 kg of polymer per mmol of Zr per hour.

The chemical composition and the material properties of this product were as follows:
(1) Chemical Composition:
   Content of ethylene unit=89.0 mole %
   Content of 1-butene unit=11.0 mole %
(2) MFR (ASTM D-1238, 190° C., 2.16 kg load)=3.6 g/10 min.
(3) Molecular weight distribution (Mw/Mn) by GPC=2.0
(4) Density=0.885 g/cm$^3$
(5) B-value=1.1
(6) Intrinsic viscosity [η]=1.48 dl/g
(7) gη*=0.89

Production Example 2

The procedures of Production Example 1 were pursued except that bis(1,3-dimethylcyclopentadienyl)zirconium was used in the place of rac-dimethylsilylene-bis(1-{2-n-propyl-4-(9-phenathryl)indenyl})zirconium dichloride, whereby a linear chain ethylene/1-butene random copolymer (B-2) was obtained.

The chemical composition and material property of this polymer product are as given below:
(1) Chemical Composition:
   Content of ethylene unit=89.2 mole %
   Content of 1-butene unit=10.8 mole %
(2) MFR (ASTM D-1238, 190° C., 2.16 kg load)=3.4 g/10 min.
(3) Molecular weight distribution (Mw/Mn) by GPC=2.0
(4) Density=0.884 g/cm$^3$
(5) B-value=1.0
(6) Intrinsic viscosity [η]=1.49 dl/g
(7) gη*1.00

Production Example 3

(Production of Propylene/Ethylene/1-butene Random Copolymer (C)

A propylene/ethylene/1-butene random copolymer was produced using a metallocene catalyst. Thus, a two liter autoclave replaced sufficiently by nitrogen gas was charged with 950 ml of hexane and 75 g of 1-butene, whereto was added 1 mmol of triisobutylaluminum. The autoclave was heated at 70° C. and was supplied with propylene and ethylene until a total pressure of 0.7 MPa (7 kgf/cm$^2$, gauge) was reached whereto were added 0.30 mmol of methylaluminoxane and 0.001 mmol, calculated as Zr atom, of rac-dimethylsilylene-bis(1-{2-n-propyl-4-(9-phenanthryl) indenyl})zirconium dichloride, whereupon propylene and ethylene were replenished succesively so as to settle the mole ratio of the supplied amount of propylene to the supplied amount of ethylene (propylene/ethylene) at 95/5, while maintaining the total pressure of 0.7 MPa (7 kgf/cm$^2$, gauge) in order to proceed polymerization for 30 minutes.

After the polymerization, the internal gas was evacuated and the resulting polymer was recovered in a plentiful amount of methanol, whereupon the polymer was dried under a reduced pressure at 110° C. for 12 hours. The resulting polymer (a propylene/ethylene/1-butene random copolymer) amounted 28.0 g and the polymerization activity was calculated to be 56 kg of polymer per mmol of Zr per hour.

The chemical composition and the material properties of this product were as follows:
(1) Chemical Composition:
   Content of propylene unit=68.5 mole %
   Content of ethylene unit=10.2 mole %
   Content of 1-butene unit=21.3 mole %
(2) MFR (ASTM D-1238, 230° C., 2.16 kg load)=4.4 g/10 min.
(3) Molecular weight distribution (Mw/Mn) by GPC=2.3

(4) Triple chain structure constituted of head-to-tail-coupled propylene unit: present
(5) Triple chain structure constituted of head-to-tail-coupled propylene unit and 1-butene unit containing propylene unit in the 2nd site: present

EXAMPLE 1

A propylene/ethylene random copolymer (A) containing 96.8 mole % of propylene unit and 3.2 mole % and having an MFR (ASTM D-1238, 230° C., 2.16 kg load) of 6.9 g/10 min., the branched long chain ethylene/1-butene random copolymer (B-1) obtained in Production Example 1 and the propylene/ethylene/1-butene random copolymer (C) obtained in Production Example 2 were blended in a mixer in a proportion given in Table 1 and the resulting mixture was melt-kneaded on an extruder at a temperature of 210° C., whereupon the kneaded mass was extruded into a form of strand. The resulting extruded polypropylene resin composition in the form of strand was cut in an aqueous medium to prepare a pelletized product of each resin composition.

This pelletized product was extruded from a die with a thin slit on an extruder (monoaxial, 40 mm φ, L/D=26, cylinder temperature=210° C.) into a monolayer non-stretched film having a thickness of 50 μm. The evaluation results of the so-obtained monolayer non-stretched film are summarized in Table 1.

EXAMPLES 2 AND 3

The procedures of Example 1 were repeated except that the polypropylene resin composition as given in Table 1 was used. The results are given in Table 1.

EXAMPLE 4

The procedures of Example 1 were repeated except that the linear chain ethylene/1-butene random copolymer (B-2) obtained in Production Example 2 was used in the place of the branched long chain ethylene/1-butene random copolymer (B-1) obtained in Production Example 1 to produce a monolayer non-stretched film. The evaluation results of the resulting non-stretched film are given in Table 1.

Comparative Example 1

The procedures of Example 1 were repeated except that the propylene/ethylene/1-butene random copolymer (C) was not used and the blended proportion of the, ethylene/1-butene random copolymer (B-1) was changed to 20 parts by weight to produce a monolayer non-stretched film having a thickness of 50 μm. The evaluation results of the so-obtained monolayer non-stretched film are summarized in Table 1.

TABLE 1

|  | Example 1 | Example 2 | Example 3 | Example 4 | Compar. Ex. 1 |
|---|---|---|---|---|---|
| Proportion (phr [1]) |  |  |  |  |  |
| (A) Random PP [2] | 80 | 80 | 85 | 80 | 80 |
| (B-1) EBR [3] | 15 | 10 | 7.5 | — | 20 |
| (B-2) EBR [4] | — | — | — | 15 | — |
| (C) PBER [5] | 5 | 10 | 7.5 | 5 | — |
| Material Property |  |  |  |  |  |
| Haze (%) | 1.5 | 1.6 | 1.3 | 1.7 | 2.3 |
| Gloss (%) | 117 | 118 | 119 | 115 | 105 |
| Film Impact (KJ/m) |  |  |  |  |  |
| at 5° C. | 38 | 29 | 22 | 40 | 32 |
| at −10° C. | 19 | 12 | 8 | 20 | 14 |
| Heat Sealabiliy (N/15 mm) |  |  |  |  |  |
| at 130° C. | 0.2 | 1.1 | 0.5 | 0.2 | 0.5 |
| 140° C. | 1.4 | 3.5 | 2.0 | 1.4 | 1.4 |
| 150° C. | 8.6 | 12.3 | 7.5 | 8.8 | 7.2 |
| 160° C. | 22.4 | 24.2 | 19.3 | 21.2 | 12.4 |
| 170° C. | 24.4 | 25.5 | 26.4 | 23.5 | 19.9 |
| 180° C. | 25.0 | — | — | 25.2 | 21.4 |
| 190° C. | 25.4 | — | — | 25.5 | 20.7 |
| 200° C. | 26.4 | — | — | 25.8 | 22.1 |

Notes:
[1] Parts by weight in hundred rate
[2] Propylene/ethylene random copolymer resin (A)
[3] Branched long chain ethylene/1-butene random copolymer (B-1) of Production Example 1
[4] Linear chain ethylene/1-butene random copolymer (B-2) of Production Example 2
[5] Propylene/ethylene/1-butene random copolymer (C) of Production Example 3

What is claimed is:

1. A heat-sealed non-stretched multi-layer film of a polypropylene resin composition comprising (A) 50–95 parts by weight of a polypropylene resin, (B) 3–40 parts by weight of an ethylene/α-olefin random copolymer with the α-olefin having at least three carbon atoms, the said random copolymer having a content of the structural unit of ethylene of 60–95 mole %, a density of 0.900 g/cm$^3$ or lower, an MFR (melt flow rate), determined according to ASTM D-1238 at 190° C. under a load of 2.16 kg) of 0.1–50 g/10 min. and a molecular weight distribution of expressed by Mw/Mn, determined by gel permeation chromatography (GPC), of 3 or less, and (C) 2–20 parts by weight of a propylene/ethylene/1-butene random copolymer, which meets the three conditions 1), 2) and 3) given below, wherein the amounts of (A), (B) and (C) sum up to 100 parts by weight and wherein the said random copolymer (C) meets the following three conditions, namely, condition 1) that it comprises 50–88 mole % of propylene unit, 2–30 mole % of ethylene unit and 10–40 mole % of 1-butene unit and that the content of 1-butene unit is greater than the content of ethylene unit;

condition 2) that it has an MFR, determined according to ASTM D-1238 at 230° C. under a load of 2.16 kg, of 0.1–50 g/10 min.; and condition 3) that it has a molecular weight distribution expressed by Mw/Mn, determined by gel permeation chromatography (GPC), of 3 or less.

2. A heat-sealed non-stretched packaging film made of the polypropylene resin composition of claim 1.

3. A heat-sealed laminated non-stretched film made of the polypropylene resin composition of claim 1.

* * * * *